United States Patent [19]
Lin et al.

[11] Patent Number: 5,365,796
[45] Date of Patent: Nov. 22, 1994

[54] DEVICE FOR MEASURING THE TENSION ON A WEB OF A PRINTING PRESS

[75] Inventors: JiaShen P. Lin, Wheaton; Xinxin Wang, Woodridge, both of Ill.

[73] Assignee: Rockwell International Corporation, El Segundo, Calif.

[21] Appl. No.: 947,326

[22] Filed: Sep. 18, 1992

[51] Int. Cl.$^5$ ............................................. G01L 5/04
[52] U.S. Cl. ............................ 73/862.391; 73/862.474
[58] Field of Search ................... 73/862.391, 862.451, 73/862.46, 862.471, 862.473, 862.474

[56] References Cited

U.S. PATENT DOCUMENTS

| | | | |
|---|---|---|---|
| 3,408,863 | 11/1968 | Guingand | 73/862.451 |
| 3,589,181 | 6/1971 | Palmatier et al. | 73/862.635 X |
| 3,902,363 | 9/1975 | Ishimoto | 73/862.451 X |
| 4,000,641 | 1/1977 | Lewis | 73/9 |
| 4,067,234 | 1/1978 | Seney | 73/862.474 |
| 4,102,183 | 7/1978 | Thenander | 73/862.391 |
| 4,470,297 | 9/1984 | Ruhl | 73/862.01 |
| 4,512,170 | 4/1985 | Hsu | 73/862.07 X |
| 4,546,656 | 10/1985 | Grundy et al. | 73/862.473 |
| 4,548,085 | 10/1985 | Grundy | 73/862.473 |
| 4,674,341 | 6/1987 | Koenig | 73/862.474 |
| 4,693,126 | 9/1987 | Hank et al. | 73/862.451 |
| 4,776,221 | 10/1988 | Friis | 73/862.451 X |
| 4,833,928 | 5/1989 | Luukkala et al. | 73/862.391 |
| 4,939,936 | 7/1990 | Spooner et al. | 73/862.391 X |
| 5,033,315 | 7/1991 | Merten et al. | 73/862.391 |

FOREIGN PATENT DOCUMENTS

| | | | |
|---|---|---|---|
| 6132535 | 10/1981 | Japan | 73/862.391 |
| 0398843 | 9/1973 | U.S.S.R. | 73/862.473 |

OTHER PUBLICATIONS

Web Tension Measurement System Boasts Very High Accuracy, Des. Eng (GB) (Aug. 1976).

*Primary Examiner*—Richard E. Chilcot, Jr.
*Assistant Examiner*—Elizabeth L. Dougherty
*Attorney, Agent, or Firm*—C. B. Patti; H. F. Hamann

[57] ABSTRACT

A device (10) for determining the tension of a web (12) on a cylinder (14) of a printing press (16) having a first device (45) for determining the wrap angle of the web (12) on the cylinder (14), a second device (29) for determining the total force applied by the web (12) on the cylinder (14), and a device (100) responsive to the first and second determining devices (45 and 29) for calculating the tension of the web (12) on the cylinder (14).

10 Claims, 8 Drawing Sheets

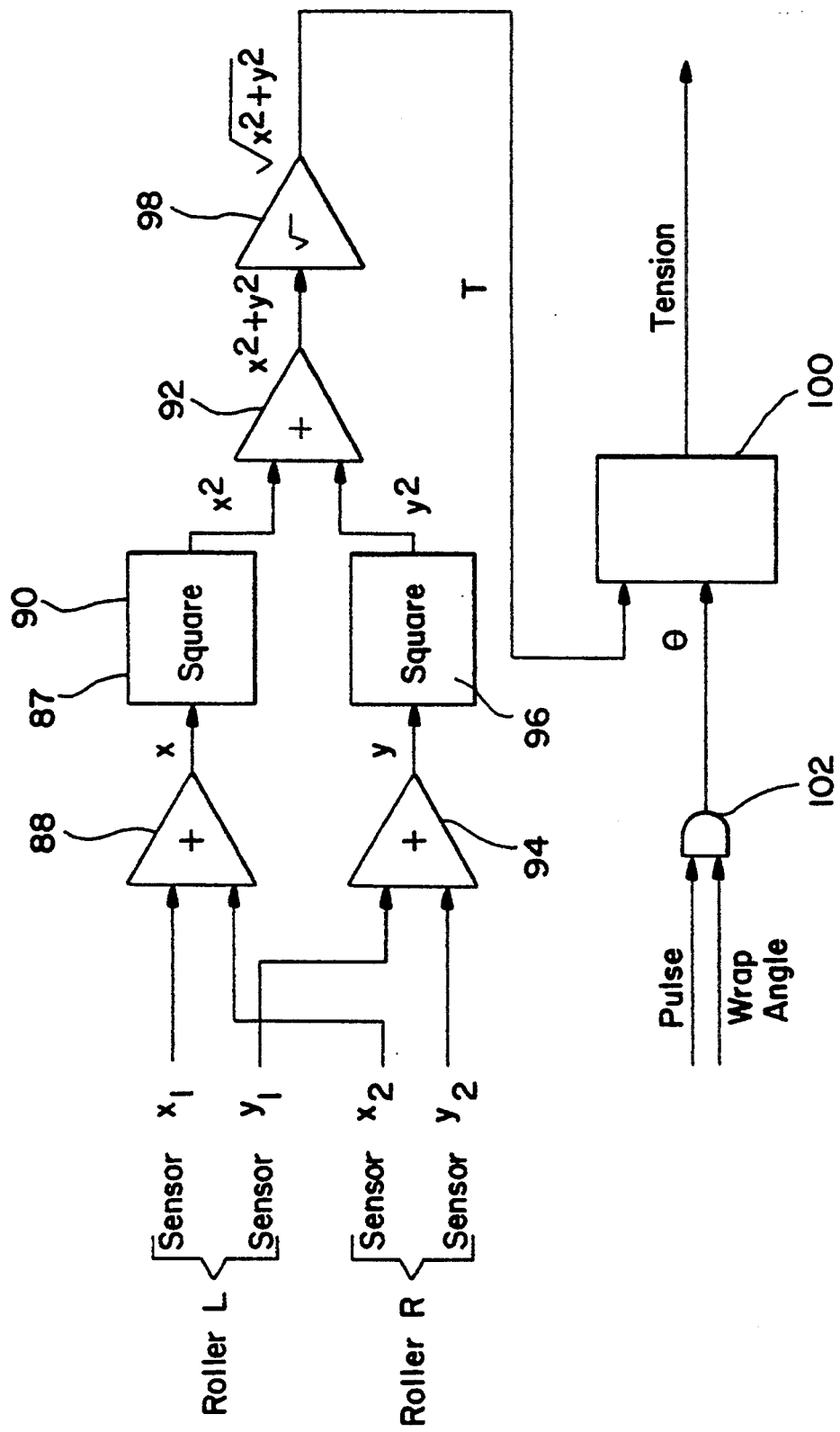

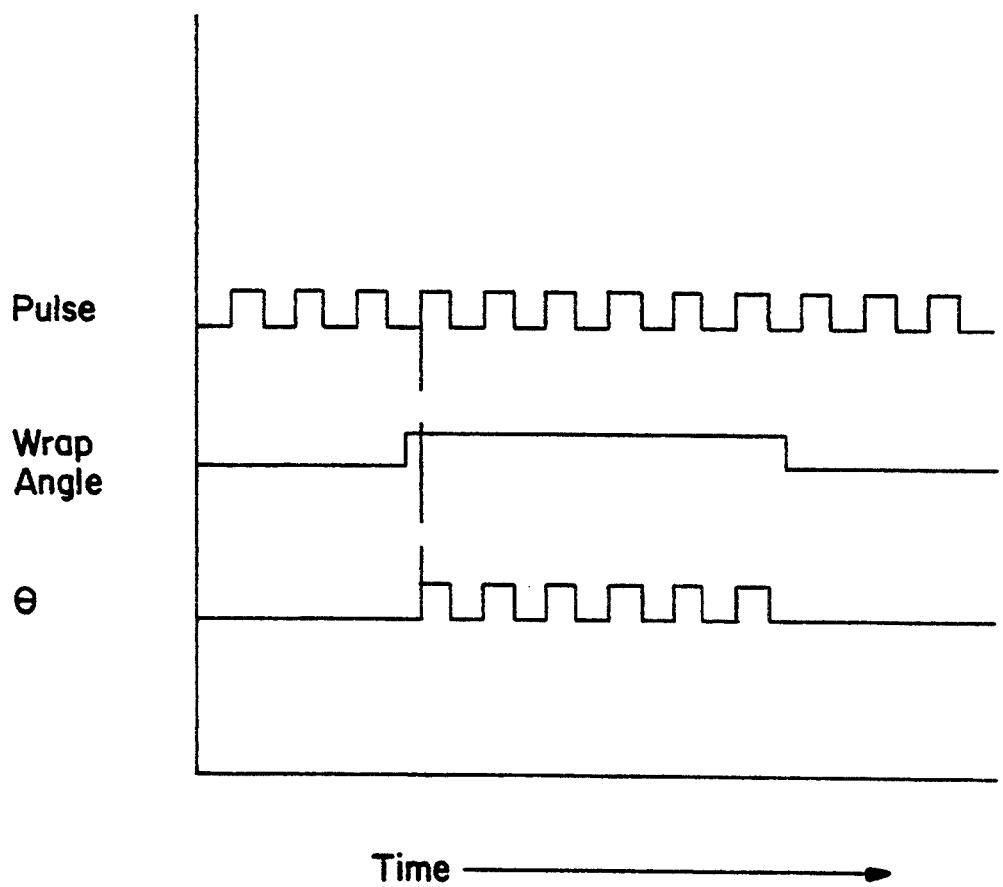

DEVICE FOR MEASURING THE TENSION ON A WEB OF A PRINTING PRESS

BACKGROUND OF THE INVENTION

The present invention relates to devices for measuring the tension on a web of a printing press.

It has been desirable to measure the tension of a paper web on a printing press since the web may break during printing in the presence of excessive tension on the web. In the past, a rope was placed over the roll to be measured, and a known weight was suspended by the rope in order to measure this tension. It was necessary to calibrate the web lead in this manner for every different web that was used during a press run or on a new press run. This procedure was time consuming and inconvenient to the operators in the press room.

The current commercial available web tension measuring device thus required a calibration for every web lead around the sensing roller. Some of the requirements in the modern high speed web-fed press operation, especially printing, are variety and flexibility in the web lead configuration. Under this condition, the full time web tension measurements at some desirable locations of the press are impractical due to the routine calibrations.

SUMMARY OF THE INVENTION

A principal feature of the present invention is the provision of an improved device for measuring the tension on a web of a printing press.

The device of the present invention comprises, first means for determining the wrap angle of the web on a cylinder of the press, and second means for determining the total force applied by the web on the cylinder.

A feature of the invention is the provision of means responsive to the first and second determining means for calculating the tension of the web on the cylinder.

Another feature of the present invention is that the device automatically calibrates the web on the cylinder.

Yet another feature of the invention is that the wrap angle may be determined by an optical device to sense the reflectivity of electromagnetic waves on the inside of the web.

A further feature of the invention is that a preload force is applied to the second determining means by structure of the cylinder.

Another feature of the invention is that the forces applied to the cylinder are measured at spaced locations.

Still another feature of the present invention is that the resultant force is determined by the forces applied to the different locations.

Yet another feature of the invention is that the preload force is subtracted from the measured force in order to determine the actual force applied by the web on the cylinder.

A feature of the invention is that the wrap angle may be combined with the actual force in order to determine the actual tension applied by the web on the cylinder.

Yet another feature of the invention is that the forces at different locations may comprise a pair of strain gauges located approximately 90 degrees apart on the cylinder.

Still another feature of the invention is that the strain gauges may be located adjacent an end of the cylinder.

A feature of the invention is that the automatic measuring device eliminates the necessity of hand calibration of the cylinder.

Another feature of the present invention is that the device simplifies the manner of calibrating the rolls of the press, and eliminates the time usually required for calculating the tension by the operator.

A further feature of the invention is that the device is of simplified construction and reduced cost.

Still another feature of the present invention is that the device continuously determines the tension on the web during a press run.

Another feature of the invention is that the device is more accurate in determining the tension on the web.

Yet another feature of the invention is that the device minimizes the possibility of web breakage due to excessive tension during a press run.

Further features will become more fully apparent from the following description of the embodiments of this invention, and from the appended claims.

DESCRIPTION OF THE DRAWINGS In the drawings:

FIG. 7 is a block diagram of a circuit for calculating tension by the device of FIG. 1; and FIG. 8 is a timing diagram of signals in the device of FIG. 1.

DESCRIPTION OF THE PREFERRED EMBODIMENTS

Figure 1:
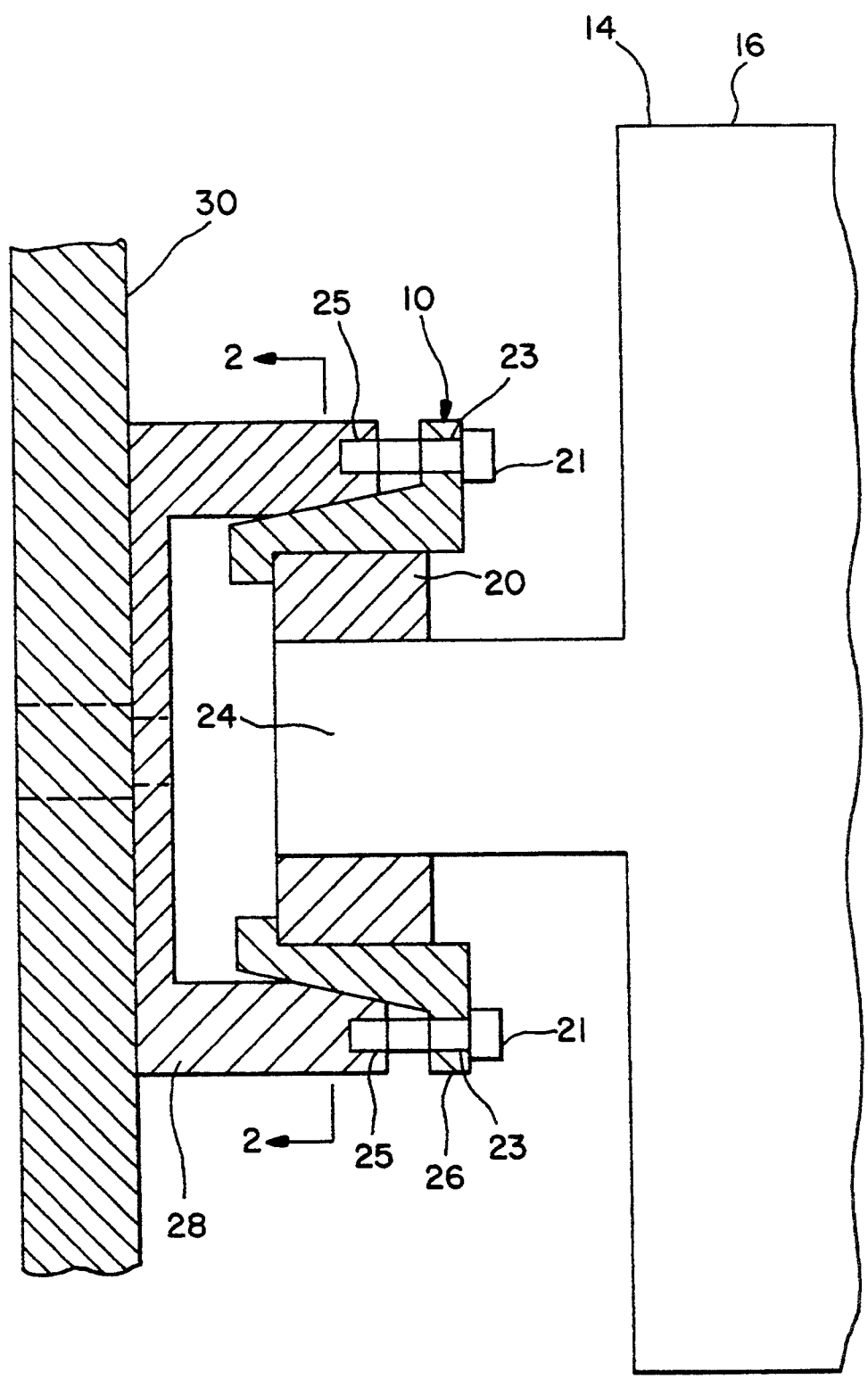
FIG. 1 is a fragmentary sectional view of a device for determining tension on a web of a printing press of the present invention.
Figure 2:
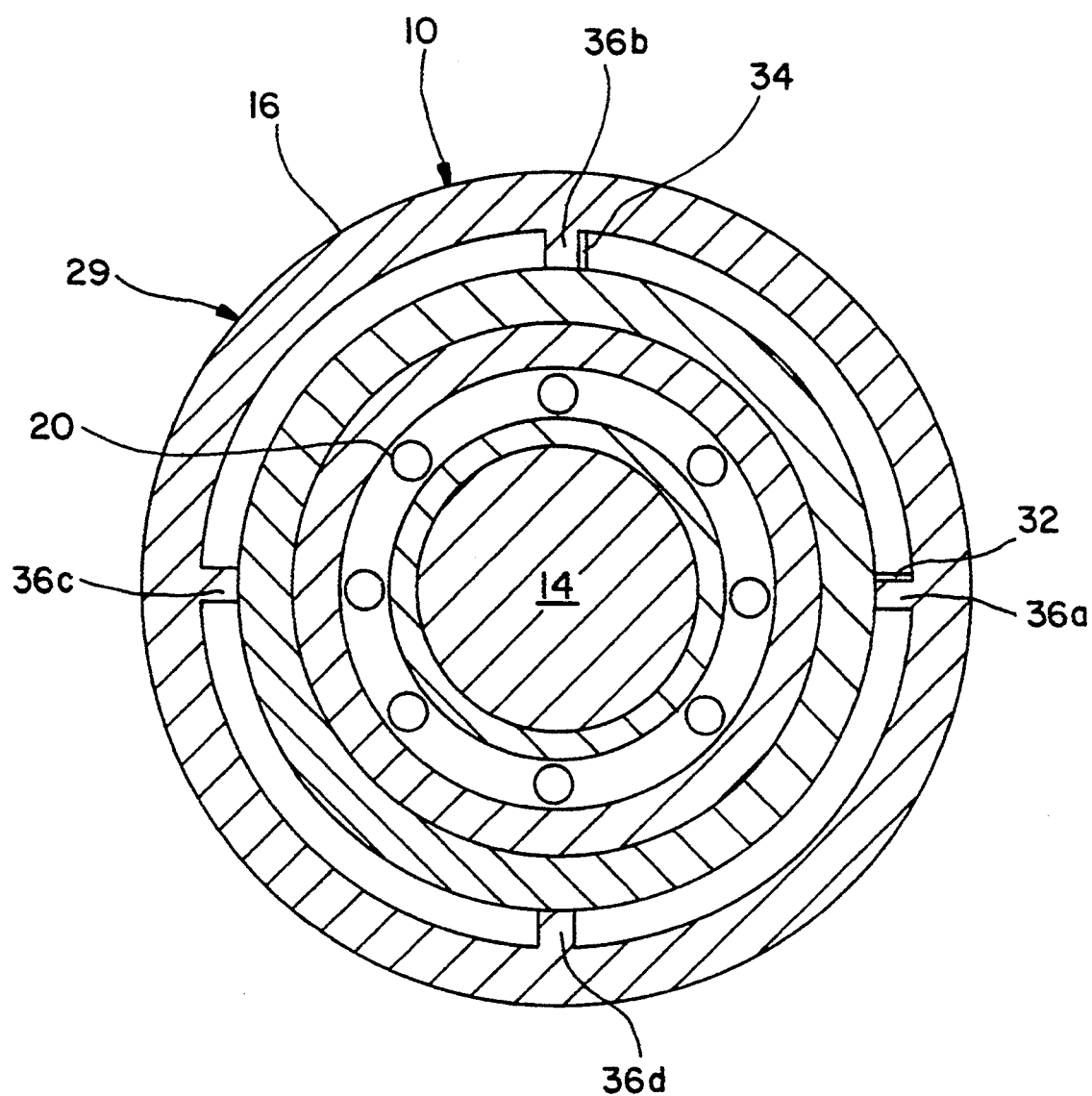
FIG. 2 is a sectional view taken substantially as indicated along the line 2—2 of FIG. 1.
Figure 3:
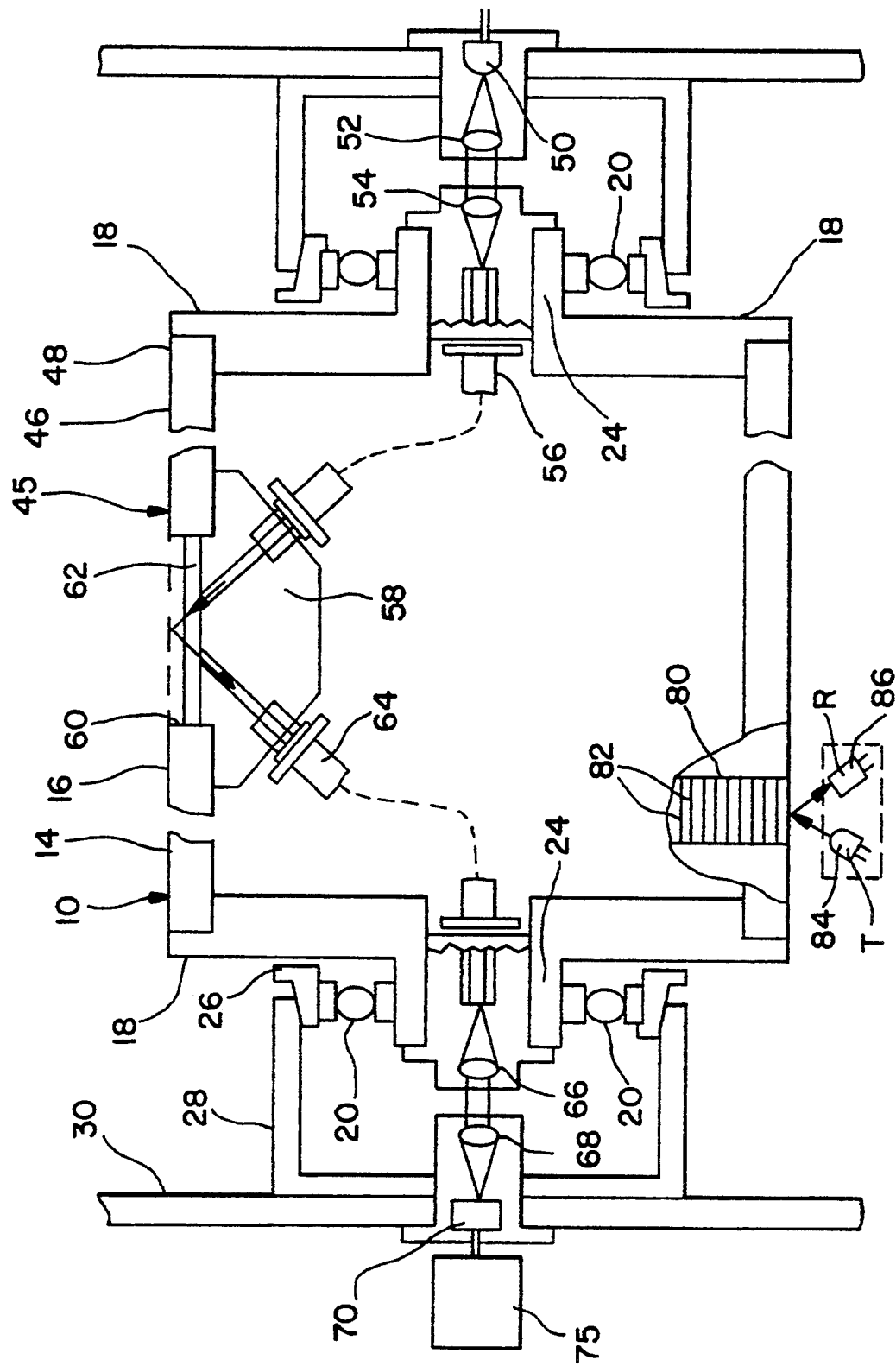
FIG. 3 is a fragmentary sectional view of the device of FIG. 1.

Referring now to FIGS. 1-3, there is shown a device generally designated 10 for determining the tension of a paper web 12 on a cylinder 14 of a printing press 16. The cylinder 14 may comprise any suitable roll in the press 16, such as near a folder or at locations next to a reel roll and dance roll, where the web lead 16 changes continuously.

The cylinder 14 has a pair of opposed end supports 18 retained by bearings 20 in an annular ring 26, the cylinder 14 having an annular extension 24 received in the bearings 20 of the press 16. The annular ring 26 applies a preload to the cylinder 14, as will be further discussed below. The device 10 has an annular housing 28 received on the ring 26, and secured on a wall 30 in order to support the cylinder 14. The device 10 has a pair of opposed threaded bolts 21 received in bores 23 of the ring 26, and received in threaded bores 25 in the end of the housing 28, such that the bolts 21 may be turned to adjust the gap between the ring 26 and housing 28.

As best shown in FIG. 2, the housing 28 has a plurality of inwardly directed flanges 36a, 36b, 36c, and 36d, located at approximately 90 degrees apart relative to each other, such that they are disposed on the inner part of the housing 28 peripherally around the ring 26. The housing 28 has a pair of strain gauges 32 and 34 or other suitable force sensors in a force determining device located adjacent the flanges 36a and 36b which are disposed at right angles to each other. It will be understood that the device 10 may have a similar structure adjacent the other end of the cylinder 14, and also having a pair of strain gauges in this similar structure.

Figure 6:
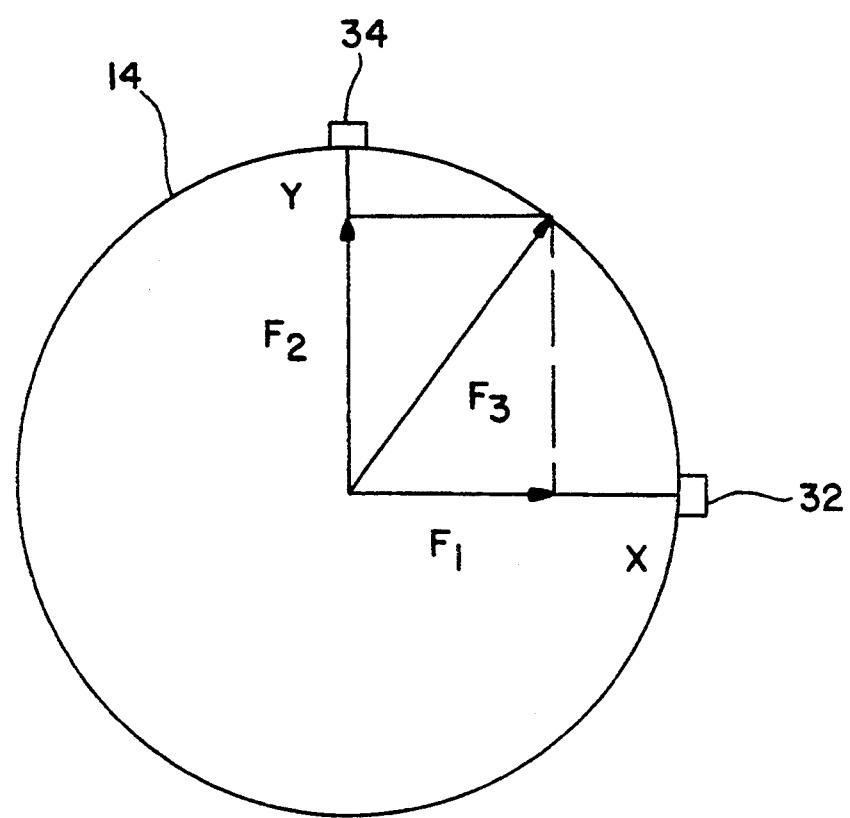
FIG. 6 is a diagram of forces applied to the cylinder by the web.

As shown in FIGS. 2 and 6, the force $F_2$ designates the force along the y axis as measured by the strain gauge 34, and the force $F_1$ designates the force along the x axis measured by the strain gauge 32. The force $F_3$ designates the resultant or total force taken from the measured forces $F_1$ and $F_2$, and is utilized to determine the tension of the web 12 on the cylinder 14, as will be seen below. The force $F_3$ includes the preload force, previously discussed, in addition to the actual force applied by the web 12 on the cylinder 14. The actual force of the web applied against the cylinder 14 can be calculated according to the following formula:

$$T = T_1 - T_0,$$

Where $T_0$ is the preload force, $T_1$ is the measured force, and T is the actual force.

Figure 5:
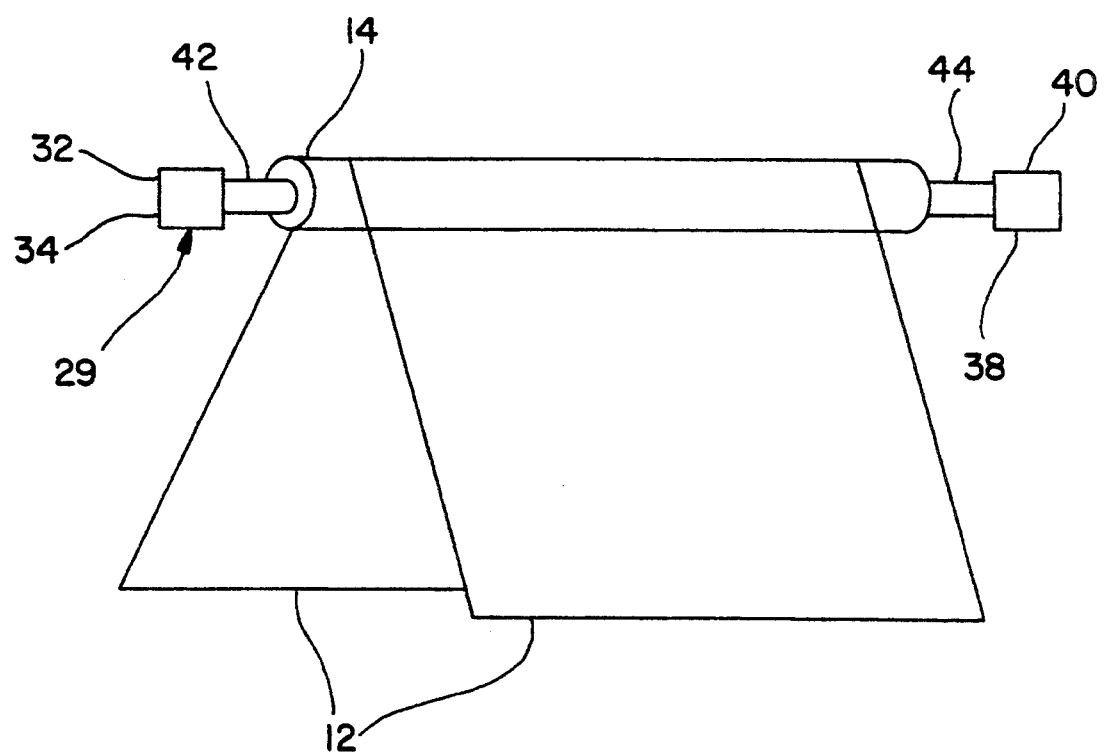
FIG. 5 is an elevational view of the device of FIG. 1.

As shown in FIG. 5, the device 10 has the sensors or a pair of strain gauges 32 and 34 adjacent one end 42 of the cylinder 14, and a pair of spaced sensors or strain gauges 38 and 40 adjacent the other end 44 of the cylinder 14. As shown, the web 12 passes over the cylinder 14 and applies a tension to the web 12. It is desirable to determine and control this tension, since an excessive tension could cause a break in the web 12.

Figure 4:
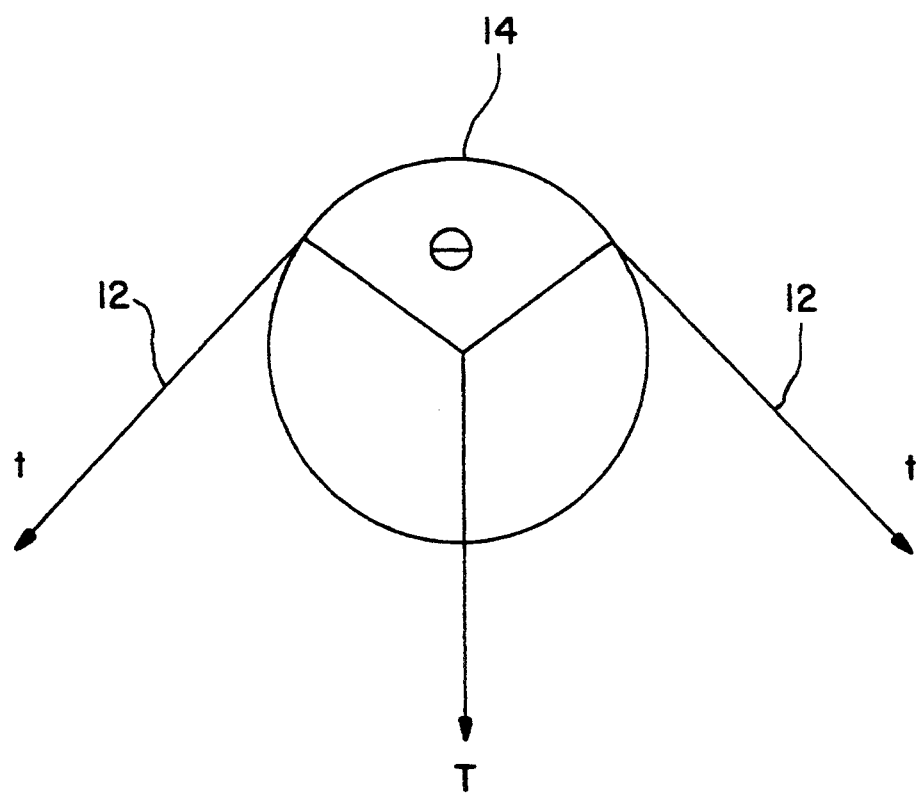
FIG. 4 is a diagram of tension as applied by the web on a cylinder.

With reference to FIG. 4, the web 12 extends around the cylinder 14 in an angle theta where the web 12 actually contacts the cylinder 14, with the remaining portion of the web 12 being spaced from the cylinder 14. Thus, the wrap angle theta specifies the actual region peripherally around the cylinder which the web 12 contacts during a press run. The tension t is directed along the web 12 on both sides of the cylinder 14, and the force T is directed intermediate both sides of the web 12.

As shown in FIG. 3, The cylinder 14 has an annular drum 46 defining an outer surface 48 of the cylinder 14. The device 10 has a light emitter or lamp 50 utilized as a light source in an optical device generally designated 45, with the lamp 50 emitting electromagnetic waves, such as light or infrared rays. The device 45 has a pair of convex lenses 52 and 54 in order to focus the rays from the lamp 50 onto a suitable optical fiber 56 which transmits the rays to a scanner head 58 which is affixed to the inside of the drum 46 adjacent a lateral central part of the drum 46. The drum 46 has an opening 60 overlying the head 58, and a protective glass 62 overlying the scanner head 58 beneath the opening 60. The rays from the optical fiber 56 are directed from the scanner head 58 through the glass 62 to the location of the web 12. In the event that the web 12 is not located over the opening 60, then the rays from the optical fiber 56 are directed out of the cylinder 14. In the event that the web 12 is located over the opening 60, the rays from the optical fiber 56 are reflected from the web 12 to a second optical fiber 64 in the scanner head 58. The optical fiber 64 then transmits the rays to the extension 24 of the cylinder 14, and through a pair of convex lens 66 and 68 to a light sensor 70 which determines the presence or absence of the rays. As shown, the device 10 may have an annular housing 72 and 74 adjacent opposed ends of the cylinder 14 for covering the optics associated with the extensions 24 of the cylinder 14.

Thus, when the scanner head 58 is located beneath the web 12 in the area of the wrap angle theta, then the rays or light will be reflected, as detected by the sensor 70 due to the presence of the reflected rays at the sensor 70. In the event the scanner head 58 is not located under the portion of the web 12 in the wrap angle theta, i.e., the web 12 is spaced from the cylinder 14, then the sensor 70 determines this condition due to the absence of the rays at the sensor 70. In this manner, the wrap angle of the web 12 and cylinder 14 may be determined by the sensor 70. As shown, the device 10 may have an annular housing 72 and 74 adjacent opposed ends of the cylinder 14 for covering the optics associated with the extensions 24 of the cylinder 14.

In this manner, the forces on the cylinder 14 due to the preload and web 12 may be determined by the strain gauges 32, 34, 38, and 40 of the force determining device 29, and the wrap angle theta may be determined by the optical device 45 including the emitter 50 and sensor 70.

As shown in FIG. 3, the cylinder 14 has a bar code 80 having a plurality of spaced bars or marks 82 extending peripherally around the drum 46. The device 10 also has a light emitter or lamp 84 directed towards the bar code 80, and a light sensor 86 positioned to receive the reflected light by the bar code 80 from the lamp 84. Thus, when the light from the lamp 84 strikes a mark 82 in the bar code 80, the sensor 86 generates a pulse, while if the light misses the marks 82, then the sensor 86 does not generate a signal. In this manner, the sensor generates a pulse train corresponding to the spaced marks, termed "PULSE", from the rotating bar code 80 for synchronization of the signals in the device 10, as shown by the timing diagram of FIG. 8. Alternatively, the device 10 may have an optical encoder 75 connected to an end of the cylinder in order to generate a pulse train for the device 10, as shown in FIGS. 3 and 8.

A circuit 87 for determining the tension t of the web 12 on the cylinder 14 is illustrated in FIG. 7. As shown, the signals $x_1$ and $x_2$ from the strain gauges in the left L and right R portions of the cylinder 14 are connected to a circuit member 88 which adds the two signals to form an x term. The signal from the circuit member 88 passes to another circuit member 90 which squares the incoming signal in order to form the term $x^2$ which passes to a third circuit member 92. The signals $y_1$ and $y_2$ from the strain gauges in the left L and right R portions of the cylinder 14 are connected to a circuit member 94 which adds the two signals to form the term y. The signal from the circuit member 94 passes to another circuit member 96 which squares the incoming signal in order to form the term $y^2$ which passes to the circuit member 92. In turn, the circuit member 92 adds the two terms from the circuit members 90 and 96 in order to form the signal $x^2 + y^2$. The resulting signal passes to another circuit member 98 which forms the square root of the signal from the circuit member 92 in order to form the resultant force T, where $T = \text{Square Root } [(x^2 + y^2)]$, which passes to another circuit member 100 for the formation of tension in the device 10.

As shown in FIG. 8, the pulse train PULSE is connected as an input to an AND gate 102, and the signal WRAP ANGLE is applied as a second input to the AND gate 102. The AND gate 102 forms a signal THETA comprising a pulse train during the time that the term WRAP ANGLE is high, thus comprising a series of pulses during the time that the web 12 is against the outer surface of the cylinder 14. In turn, the circuit member 100 calculates the tension t of the web 12 against the cylinder 14 from the terms T and THETA in accordance with the following relationship:

$$t = (T/2)([\sin(Theta/2)]^{-1}),$$

where
T = Actual Force of the web 12,
Theta = Wrap Angle of the web 12, and
t = Tension of the web 12.

The tension t may be displayed on the monitor of a suitable computer, or may be used in the press 16 in order to modify tension t to a desired value, and prevent excessive tension t of the web 12.

In this manner, the tension t is automatically determined during a press run in a simplified manner while eliminating operator intervention to facilitate speed and convenience of the press run, and thus eliminate the tedious calibration where the tension is calculated by hand each time the web lead is changed.

The foregoing detailed description has been given for clearness of understanding only, and no unnecessary limitations should be understood therefrom, as modifications will be obvious to those skilled in the art.

What is claimed is:

1. A device for measuring tension on a web of a printing press, comprising:
   first means for determining the wrap angle of the web on a cylinder;
   second means for determining the total force applied by the web on the cylinder; and
   means responsive to the first and second determining means for calculating the tension of the web on the cylinder, wherein the first means for determining comprises sensing means for sensing the presence of the web on an outer surface of the cylinder rotates beneath the web and the sensing means comprises means for directing a source of electromagnetic waves beneath the outer surface of the cylinder against the web, and means for detecting the presence of reflected electromagnetic waves from the web.

2. The device of claim 1 wherein the source of electromagnetic waves comprises an infrared beam.

3. The device of claim 1 including optical fiber for directing the waves onto the web, and optical fiber for transmitting a reflected portion of the waves.

4. The device of claim 1 wherein the second determining means comprises, means for measuring the force applied at spaced locations to the cylinder by the web.

5. The device of claim 4 wherein the measuring means comprises a pair of strain gauges.

6. The device of claim 4 wherein the measuring means comprise means for determining the resultant force applied to the cylinder at the spaced locations.

7. The device of claim 4 wherein the measuring means is located adjacent an end of the cylinder.

8. A device for measuring tension on a web of a printing press, comprising:
   first means for determining the resultant force applied by the web on a cylinder of the press;
   second means for calculating the wrap angle of the web on the cylinder; and
   means for determining the tension of the web on the cylinder according to the relationship:

$$t = (T/2)([\sin(Theta/2)]^{-1}),$$

where
   T = Resultant Force of the web;
   Theta = Wrap Angle of the web, and
   t = tension of the web, wherein the resultant force is formed from the following relationship:

$$T = T_1 - T_0,$$

where
   $T_0$ = Preload Force;
   $T_1$ = Measured Force; and
   T = Resultant Force.

9. A device for measuring tension on a web of a printing press, comprising:
   first means for determining the wrap angle of the web on a cylinder;
   second means for determining the total force applied by the web on the cylinder; and
   means responsive to the first and second determining means for calculating the tension of the web on the cylinder, wherein the second determining means comprises, means for measuring the force applied at spaced locations to the cylinder by the web, and the spaced locations are located approximately 90 degrees apart.

10. A device for measuring tension on a web of a printing press, comprising:
    first means for determining the wrap angle of the web on a cylinder;
    second means for determining the total force applied by the web on the cylinder; and
    means for responsive to the first and second determining means for calculating the tension of the web on the cylinder, wherein the second determining means comprises, means for measuring the force applied at spaced locations to the cylinder by the web, and including means for applying a preload force against the cylinder.

* * * * *